J. W. GATES, DEC'D.
A. C. GATES, ADMINISTRATRIX.
ANIMAL TRAP.
APPLICATION FILED OCT. 4, 1911.

1,091,926.

Patented Mar. 31, 1914.

Witnesses
Frank Waterfield
O. H. Gatchel

Inventor
John W. Gates
by E. E. Dorsham
Atty.

UNITED STATES PATENT OFFICE.

JOHN W. GATES, OF LOS ANGELES, CALIFORNIA; AMALIA C. GATES ADMINISTRATRIX OF SAID JOHN W. GATES, DECEASED.

ANIMAL-TRAP.

1,091,926.   Specification of Letters Patent.   Patented Mar. 31, 1914.

Application filed October 4, 1911. Serial No. 652,677.

*To all whom it may concern:*

Be it known that I, JOHN W. GATES, a citizen of the United States, residing at Los Angeles, county of Los Angeles, State of California, have invented new and useful Improvements in Animal-Traps, of which the following is a specification.

Figure 4:
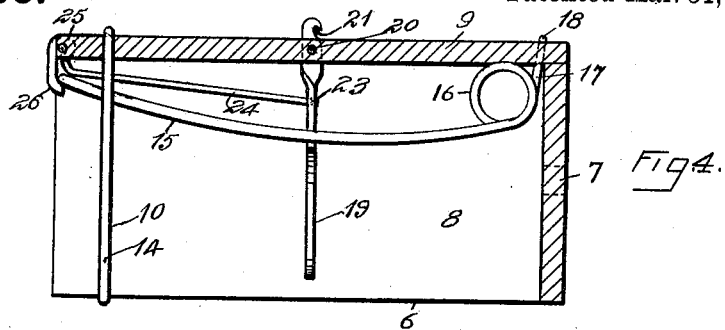
Figure 1:
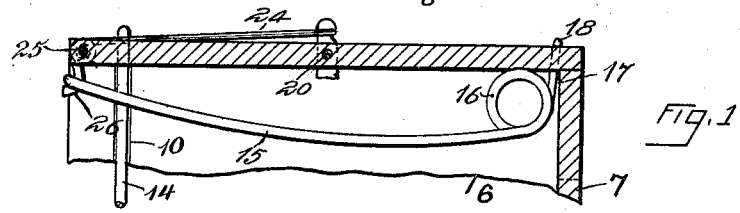
Figure 2:
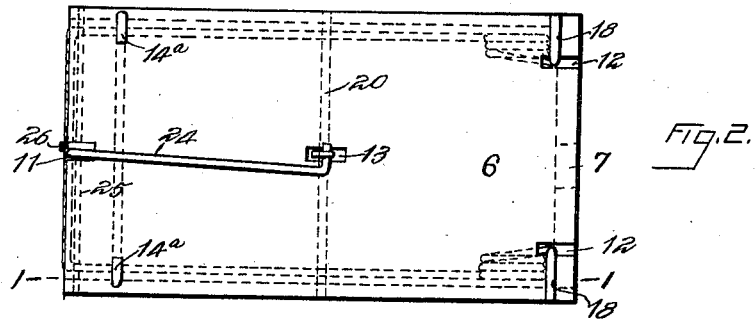
Figure 3:
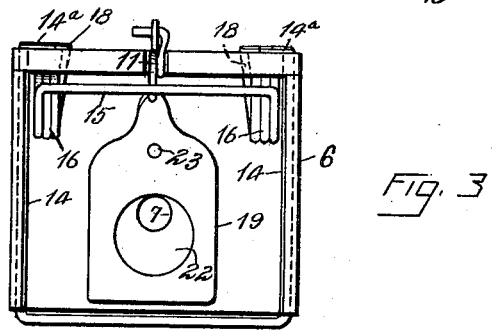

My invention relates to that class of traps known as box gopher traps and the object thereof is to provide a trap of improved construction. I accomplish this object by the trap described herein and illustrated in the accompanying drawings, in which;

Figure 1 is a section on the line 1—1 of Fig. 2. Fig. 2 is a top plan of Fig. 1. Fig. 3 is a front end elevation. Fig 4 is a view similar to Fig. 1 showing a modified form of keeper.

In the drawings 6 designates the box or body of the trap which is preferably made of wood and is open at the front and bottom and has a light opening 7 in the rear end. The side walls 8 are nailed to the top wall 9 and have kerfs 10 on the inner side near the front end. In the center of the top wall at the front end is a longitudinal slit 11 and at the rear end near the sides are longitudinal slits 12 and at the center is an aperture 13. The rear end of the top wall when the parts are assembled rests upon the rear end of the body and is nailed thereto. An abutment yoke 14 is formed of wire which is U-shaped and has the ends 14ª of the wire bent inwardly a short distance so that when the parts are assembled these short ends lie on the top and the sides lie in the kerfs in the side walls and the cross bar extends from side to side at the bottom. The working jaw 15 is U-shaped at its front end. It is formed of spring wire and has coils 16 near the rear ends. At the rear of the coils the ends 17 are bent at an obtuse angle to the portion in front of the coils and at a distance above the coils equal to the thickness of the top walls they are again bent at right angles outwardly to form holding portions 18 which, when the parts are assembled rest upon the top wall and preferably also upon the top of the side wall.

A trigger 19 is pivotally suspended in the aperture in the top wall by a pintle wire 20. The top projects above the top wall and is provided with a catch 21. The body of the trigger has a light opening 22 in line with the opening in the rear end. It also has a keeper opening 23 below the top wall. A keeper 24 is pivotally mounted in the slit in the front end of the top wall by a wire 25 that is passed through a hole running transversely through the front end of the top wall. If the body of the keeper extends rearwardly on the top of the top wall as shown in Figs. 1 to 3 the rear end thereof is engaged by the catch at the top of the trigger when the trap is set. If the body of the keeper extends rearwardly below the top wall the rear end extends into the keeper opening in the trigger when the trap is set. At the front end of the keeper is a catch 26 which engages and holds the front end of the working jaw elevated when the trap is set. By this construction the strain of catching the animal is principally borne by the top wall. This construction enables the operator to easily assemble the parts.

The abutment yoke is placed on the front end of the top. The rear ends of the working jaw are then passed into the slits in the rear end of the top. The front end of the jaw is then passed into the abutment yoke when the two parts are securely held to the top. The side walls are then nailed to the top with the sides of the abutment yoke in the kerfs of the sides. The rear end is then nailed in place. The trigger and keeper are then put in place.

By this construction the different parts are completely formed before they are assembled.

In the operation of my trap, the hole or burrow of the animal being trapped, which in practice is principally the gopher, is opened. The free end of the working jaw is raised to the top of the box and is there caught and held by the keeper. The rear end of the keeper is then caught and held by the trigger, when the trap is set, and the open end is placed in the open end of the burrow. The dirt is then packed around the box so as to prevent the light entering the burrow except through the hole in the rear of the box. When the gopher in passing through his burrow discovers light entering it he fills his pockets with dirt and goes to the place that the light is entering to close the place up. In so doing he pushes the body of the trigger rearwardly thereby releasing the keeper which then permits the working jaw to strike the gopher on the back and pinion him between the jaw and the abutment where he is held until removed.

By putting a bottom in the box at the front end the abutment can be dispensed with. By this construction the trigger can be set fine or coarse as desired. It will be observed that either form of keeper can be used with the other parts. When the body of the keeper is on the top of the box the operator can tell by looking whether the trap is sprung. When the body of the keeper is under the top, by placing a finger on the top of the trigger and gently pressing it backward he can tell whether the trap is sprung.

Having described my invention what I claim is:

1. An animal trap comprising a box open at one end and having a light opening in the other end, and a central slit in the front end and two slits in the rear end and a central aperture, all in the top wall; a U-shaped spring wire working jaw having the sides formed into coils near the ends thereof and the ends being bent at an obtuse angle to the front portion and then outwardly, the rear ends passing through the slits in the rear end of the top wall when the parts are assembled and lying upon the top wall; a trigger pivotally mounted in the central aperture in the top wall, said trigger having keeper engaging means; and a keeper pivotally mounted in the front end of the top wall and having a rearwardly extending body engaging the trigger when set, said keeper having a catch at its front end to engage and hold the working jaw elevated when the trap is set.

2. In a trap of the character described herein the combination of a U-shaped working jaw having its arms coiled into springs near the ends thereof and having its ends bent upwardly and then outwardly; in combination with a box having an open front and slits in the rear end of the top, said slits being at right angles when the parts are positioned for use to the terminal ends of the working jaw; a U-shaped abutment yoke near the open front and extending upwardly through the top of the box and then inwardly; and a trigger and keeper mounted in the top of the box, said keeper being adapted to hold the working jaw positioned for use and the trigger being adapted to hold the keeper positioned for use.

In witness that I claim the foregoing I have hereunto subscribed my name this 19th day of September, 1911.

JOHN W. GATES.

Witnesses:
G. E. HARPHAM.
FRANK WATERFIELD.